Patented Jan. 26, 1954

2,667,472

UNITED STATES PATENT OFFICE 2,667,472

SHORTSTOPPING OF BUTADIENE-STYRENE EMULSION POLYMERIZATION

Robert W. Brown, Naugatuck, Conn., assignor to United States Rubber Company, New York, N. Y., a corporation of New Jersey No Drawing. Application February 24, 1950, Serial No. 146,164

3 Claims. (Cl. 260—84.3)

This invention relates to the use of a new shortstopping agent in the preparation of synthetic rubber latices.

It is known to produce synthetic rubber latices by the emulsion polymerization of butadiene-1,3 and styrene, in the presence of a catalyst and, if desired, a so-called polymerization regulator or modifier, such as an alkyl mercaptan having 6 to 18 carbon atoms or an aromatic mercaptan. In practice, the emulsion polymerization is not allowed to go to completion because of the excessive time necessary for conversion of the polymerizable monomers and because of the undesirable properties that may be imparted to the synthetic rubber where the polymerization has been permitted to go to complete conversion. Polymerization is generally permitted to go to around 50 to 90% of completion as determined by consumption of original monomers. The unreacted polymerizable monomeric materials are removed from the latex as by venting off monomers which are gaseous at atmospheric pressure, and steam or vacuum distilling residual higher boiling point or liquid monomers, and the thus recovered polymerizable monomers are utilized in subsequent emulsion polymerization. Before removing the unreacted monomers from the synthetic rubber latex, particularly any liquid monomers, there is added to the latex a so-called shortstopping agent which prevents further polymerization of the monomers during the removal operation. The polymerization of residual monomers during the monomer removing or so-called stripping operation imparts undesirable physical properties to the synthetic rubber. Various materials, such as hydroquinone, dialkyl substituted hydroquinones, particularly 2,5-ditertiary butyl hydroquinone, and polynitro aromatic compounds, particularly 2,4-dinitro chlorobenzene, have been used as shortstopping agents, but they have various disadvantages. Hydroquinone and dialkyl substituted hydroquinones discolor the resulting synthetic rubber which is a disadvantage in the production of light-colored products. The 2,5-ditertiary butyl hydroquinone is insoluble in water and the commonly used monomers, necessitating its addition to latex as an aqueous dispersion, or dissolved in an organic solvent. It is inconvenient to prepare aqueous dispersions of such insoluble materials, and the addition of such materials in organic solvents may destabilize the latex and complicate the recovery of monomers. Polynitro aromatic compounds may impart undesirable toxicity to the polymer, give colored latices, and are also insoluble in water.

I have discovered that xanthogen polysulfides containing 3 to 7 sulfur atoms are effective shortstopping agents which do not have the disadvantages of the above referred prior shortstopping agents. The xanthogen polysulfides which are used as shortstopping agents in the present invention are characterized by the structure

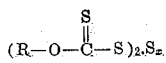

where R is an alkyl group and $x$ may vary from one to five. The chemical constitution of polysulfides of this general type is a matter of some dispute. Some of the sulfur may be removed by means usually considered to be physical in nature, and definite compounds are difficult to isolate. There is no question, however, but what the sulfur is combined with the rest of the molecule by forces stronger than the usual physical ones, for the polysulfides once formed, are stable in solvents in which uncombined sulfur will not dissolve appreciably. The polysulfides are prepared by heating the requisite amount of sulfur and xanthogen disulfide together at about 120° C. until a homogenous liquid is produced. Examples of the xanthogen polysulfides of this invention are dimethyl xanthogen trisulfide, dimethyl xanthogen tetrasulfide, dimethyl xanthogen pentasulfide, dimethyl xanthogen hexasulfide, dimethyl xanthogen heptasulfide, diethyl xanthogen trisulfide, diethyl xanthogen tetrasulfide, diethyl xanthogen pentasulfide, diethyl xanthogen hexasulfide, diethyl xanthogen heptasulfide, di-isopropyl xanthogen trisulfide, di-isopropyl xanthogen tetrasulfide, di-isopropyl xanthogen pentasulfide, di-isopropyl xanthogen hexasulfide, di-isopropyl xanthogen heptasulfide, etc. The amount of such xanthogen polysulfide to stop the polymerization reaction should be in the range of 0.1 to 1 part by weight per 100 parts of polymerizable material originally present in the emulsion. The xanthogen polysulfide may be added to the aqueous emulsion polymerizate after the conversion of 50 to 90% of polymerizable monomers originally present to synthetic rubber depending on the particular monomers and the physical properties desired in the final synthetic rubber product. The xanthogen polysulfide may be added to the synthetic rubber latex to stop further polymerization before removal of any unreacted monomers. The butadiene may be vented from the reactor by reducing the pressure to atmospheric pressure before addition of the xanthogen polysulfide, after which addition the higher boiling styrene may be recovered by conventional steam or vacuum distillation. In any case, the xanthogen polysulfide should be added to the latex after the desired polymerization of 50 to 90% conversion and while the latex still contains unreacted monomeric material.

The catalysts used in the preparation of such synthetic rubber latices are the conventional peroxygen or azo catalysts. Examples of peroxygen catalysts are hydrogen peroxide, per-salts, e. g. alkali persulfates, alkali perborates and alkali percarbonates, and organic peroxides, e. g. diacetyl peroxide, dibenzoyl peroxide, acetyl benzoyl peroxide, tertiary butyl hydroperoxide, cumene hydroperoxide. Examples of azo catalysts are alpha,alpha'-azobisisobutyronitrile, and p-methoxy benzene diazo thio 2-naphthyl ether.

The following examples are given in illustration of the invention, the parts referred to being by weight:

*Example I*

The following recipe was polymerized at 5° C. in an internally agitated autoclave until approximately 60% of the monomers were converted to polymer:

| | |
|---|---|
| Butadiene | 71 |
| Styrene | 29 |
| Cumene hydroperoxide | 0.08 |
| Mixed tertiary $C_{12}$-, $C_{14}$- and $C_{16}$- mercaptans | 0.22 |
| Disproportionated rosin soap (sodium soap) | 4.7 |
| Sodium hydroxide | 0.05 |
| Sodium alkyl naphthalene sulfonate | 0.10 |
| Potassium chloride | 0.20 |
| Sodium silicate | 0.16 |
| Ferrous sulfate | 0.20 |
| Water | 180 |

Samples of the latex were then withdrawn into crown capped bottles, one containing 0.3 part of diethyl xanthogen trisulfide per 100 parts of original monomers, and the other containing an equal amount of a known shortstopping agent, 2,5-ditertiarybutyl hydroquinone. The bottles were then placed in a water bath at 45° C. and rotated end over end for 16 hours to submit the latices to severe polymerizing conditions. At the end of this period, unreacted butadiene was vented off and the conversion of monomers to polymer was determined by evaporation of a weighed sample of the latex. The bulk of the latices were then steam distilled to remove unreacted styrene, and coagulated. The polymers were dried. The plasticities of the products were measured on the Mooney Shearing Disc Plastometer (as described by Mooney in "Industrial and Engineering Chemistry" (Analytical Edition), 6, 147 (1934)). The results are given as Mooney viscosities on an arbitrary scale, the higher the value the more difficult to break down mechanically, and the greater the cross-linking. Obtaining approximately the same Mooney viscosities from latices to which have been added an unknown material to be tested as a shortstopping agent and a known shortstopping agent and then aged in the presence of the unreacted monomers, shows the effectiveness of the unknown material as a shortstopper.

The conversion with the diethyl xanthogen trisulfide was 67% and with the 2,5-ditertiarybutyl hydroquinone was 64%. The Mooney viscosity with the diethyl xanthogen trisulfide was 74 and with the 2,5-ditertiarybutyl hydroquinone was 64.

Similar shortstopping tests on other portions of the latex with 0.3 part of diethyl xanthogen tetrasulfide per 100 parts of original monomers gave a conversion of 64% and a Mooney viscosity of 68 for the xanthogen tetrasulfide, and a conversion of 64% and a Mooney viscosity of 64 for the 2,5-ditertiarybutyl hydroquinone.

Similar shortstopping tests on other portions of the latex with 0.15 part of diethyl xanthogen pentasulfide per 100 parts of original monomers gave a conversion of 57% and a Mooney viscosity of 64 for the xanthogen pentasulfide, and a conversion of 54% and a Mooney viscosity of 68 for the 2,5-ditertiarybutyl hydroquinone.

Similar shortstopping tests on other portions of the latex with 0.15 part of diethyl xanthogen hexasulfide per 100 parts of original monomers gave a conversion of 56% and a Mooney viscosity of 87 for the xanthogen hexasulfide, and a conversion of 55% and a Mooney viscosity of 88 for the 2,5-ditertiarybutyl hydroquinone.

Similar shortstopping tests on other portions of the latex with 0.3 part of diethyl xanthogen heptasulfide per 100 parts of original monomers gave a conversion of 62% and a Mooney viscosity of 49 for the xanthogen heptasulfide, and a conversion of 64% and a Mooney viscosity of 56 for the 2,5-ditertiarybutyl hydroquinone.

*Example II*

The following recipe was polymerized at −18° C. in an internally agitated autoclave until approximately 60% of the monomers were converted to polymer:

| | |
|---|---|
| Butadiene | 71 |
| Styrene | 29 |
| Cumene hydroperoxide | 0.30 |
| Mixed tertiary $C_{12}$-, $C_{14}$-, and $C_{16}$- mercaptans | 0.17 |
| Potassium laurate | 5.95 |
| Sodium sulfite | 0.08 |
| Sodium pyrophosphate | 0.38 |
| Ferrous sulfate | 0.40 |
| Water | 180 |
| Methyl alcohol | 60 |

Samples of the latex were then withdrawn into crown capped bottles, one containing 0.3 part of diethyl xanthogen trisulfide per 100 parts of original monomers, and the other containing 0.4 part of 2,5-ditertiary butyl hydroquinone. The bottles were then placed in a water bath at 45° C. and thereafter treated like those described in Example I.

The conversion with the diethyl xanthogen trisulfide was 67% and with the 2,5-ditertiary butyl hydroquinone 64%. The Mooney viscosity with the diethyl xanthogen trisulfide was 49 and with the 2,5-ditertiary butyl hydroquinone was 55.

Similar shortstopping tests on other portions of the latex with 0.3 part of diethyl xanthogen hexasulfide per 100 parts of original monomers gave a conversion of 62% and a Mooney viscosity of 48 for the xanthogen hexasulfide, and a conversion of 65% and a Mooney viscosity of 56 for the 2,5-ditertiary butyl hydroquinone.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the preparation of a synthetic rubber latex by the polymerization of an aqueous emulsion of a mixture of butadiene-1,3 and styrene, the steps which comprise adding to the emulsion 0.1 to 1 part by weight of a xanthogen polysulfide containing 3 to 7 sulfur atoms per 100 parts by weight of polymerizable material initially present, said xanthogen polysulfide addition being the first addition of the chemical and said addition being after conversion of 50 to 90% of the polymerizable material originally present in the emulsion to synthetic rubber to stop polymerization of unreacted polymerizable monomeric material, and thereafter removing unreacted polymerizable monomeric material from the latex.

2. In the preparation of a synthetic rubber latex by the polymerization of an aqueous emulsion of a mixture of butadiene-1,3 and styrene, the steps which comprise adding to the emulsion 0.1 to 1 part by weight of a xanthogen polysulfide containing 3 to 7 sulfur atoms per 100 parts by weight of polymerizable material initially present, said xanthogen polysulfide addition being the first addition of the chemical and said addition being after conversion of 50 to 90% of the polymerizable material originally present in the emulsion to synthetic rubber to stop polymerization of unreacted polymerizable monomeric material and while the latex contains unreacted styrene, and thereafter removing unreacted styrene from the latex.

3. In the preparation of a synthetic rubber latex by the polymerization of an aqueous emulsion of a mixture of butadiene-1,3 and styrene, the steps which comprise adding to the emulsion 0.1 to 1 part by weight of diethyl xanthogen pentasulfide per 100 parts by weight of polymerizable material initially present, said xanthogen pentasulfide addition being the first addition of the chemical and said addition being after conversion of 50 to 90% of the polymerizable material originally present in the emulsion to synthetic rubber to stop polymerization of unreacted polymerizable monomeric material and while the latex contains unreacted styrene, and thereafter removing unreacted styrene from the latex.

ROBERT W. BROWN.

References Cited in the file of this patent

UNITED STATES PATENTS

| Number | Name | Date |
| --- | --- | --- |
| 2,376,391 | Semon | May 22, 1945 |
| 2,500,983 | Frolich et al. | Mar. 21, 1950 |